US011591122B2

(12) United States Patent
Wipf (10) Patent No.: US 11,591,122 B2
(45) Date of Patent: Feb. 28, 2023

(54) CONSUMABLE-MATERIAL HANDLING DEVICE FOR TRANSPORTING AND/OR HANDLING AT LEAST ONE CONSUMABLE MATERIAL, IN PARTICULAR PACKAGING MATERIAL

(71) Applicant: Syntegon Packaging Systems AG, Beringen (CH)

(72) Inventor: Alfred Wipf, Jestetten (DE)

(73) Assignee: Syntegon Packaging Systems AG, Beringen (CH)

( * ) Notice: Subject to any disclaimer, the term of this patent is extended or adjusted under 35 U.S.C. 154(b) by 748 days.

(21) Appl. No.: 16/605,124

(22) PCT Filed: Apr. 11, 2018

(86) PCT No.: PCT/EP2018/059211
§ 371 (c)(1),
(2) Date: Oct. 14, 2019

(87) PCT Pub. No.: WO2018/192808
PCT Pub. Date: Oct. 25, 2018

(65) Prior Publication Data
US 2020/0156813 A1    May 21, 2020

(30) Foreign Application Priority Data
Apr. 19, 2017   (DE) .................... 10 2017 206 549.4

(51) Int. Cl.
*B65B 41/00* (2006.01)
*G06F 7/00* (2006.01)
(Continued)

(52) U.S. Cl.
CPC .............. *B65B 41/12* (2013.01); *B25J 5/007* (2013.01); *B25J 15/0038* (2013.01);
(Continued)

(58) Field of Classification Search
CPC ....... B65B 41/12; B25J 5/007; B25J 15/0038; B25J 15/0047; B65H 19/12;
(Continued)

(56) References Cited

U.S. PATENT DOCUMENTS 5,274,984 A   1/1994   Fukuda
5,730,389 A   3/1998   Biagiotti
(Continued)

FOREIGN PATENT DOCUMENTS

DE    3425734    1/1985
DE    3519580    3/1987
(Continued)

OTHER PUBLICATIONS

International Search Report for Application No. PCT/EP2018/059211 dated Jul. 23, 2018 (English Translation, 4 pages).
(Continued)

*Primary Examiner* — Yolanda R Cumbess
(74) *Attorney, Agent, or Firm* — Michael Best & Friedrich LLP (57) ABSTRACT

The invention relates to a consumable-material handling device for transporting and/or handling at least one consumable material (12a; 12b), in particular packaging material, comprising at least one at least partially autonomous handling unit (14a; 14b), which is at least provided for handling the consumable material (12a; 12b). According to the invention, the machine tool comprises at least one, in particular at least partially autonomous, mobility unit (16a; 16b), on which the handling unit (14a; 14b) is arranged and which is at least provided for enabling locomotion, in particular at least partially autonomous locomotion, of the handling unit (14a; 14b).

12 Claims, 4 Drawing Sheets

(51) Int. Cl.
*B65B 41/12* (2006.01)
*B65H 19/12* (2006.01)
*B65H 75/24* (2006.01)
*B25J 15/00* (2006.01)
*B25J 5/00* (2006.01)

(52) U.S. Cl.
CPC .......... *B25J 15/0047* (2013.01); *B65H 19/12* (2013.01); *B65H 75/242* (2013.01); *B65H 2301/4173* (2013.01); *B65H 2405/422* (2013.01); *B65H 2515/10* (2013.01); *B65H 2553/42* (2013.01); *B65H 2555/30* (2013.01); *B65H 2801/81* (2013.01); *Y10S 414/123* (2013.01); *Y10S 414/124* (2013.01)

(58) Field of Classification Search
CPC .......... B65H 75/242; B65H 2301/4173; B65H 2405/422; B65H 2515/10; B65H 2553/42; B65H 2555/30; B65H 2801/81; B65H 2405/4226; Y10S 414/123; Y10S 414/124
USPC ................ 53/389.3, 441, 498, 531; 700/213
See application file for complete search history.

(56) References Cited

U.S. PATENT DOCUMENTS

| | | | |
|---|---|---|---|
| 2003/0087740 A1* | 5/2003 | Brinkmann .......... | B65H 23/048 493/147 |
| 2005/0189449 A1* | 9/2005 | Bilskie ................ | B65H 19/126 242/559.1 |
| 2010/0154355 A1 | 6/2010 | Freudenberg et al. | |
| 2013/0054029 A1 | 2/2013 | Huang et al. | |
| 2013/0061558 A1* | 3/2013 | Klear .................... | B65B 11/025 53/218 |
| 2016/0331857 A1 | 11/2016 | Kawamura et al. | |
| 2017/0001741 A1 | 1/2017 | Gautheron | |

FOREIGN PATENT DOCUMENTS

| | | | |
|---|---|---|---|
| DE | 4234674 A1 | 4/1993 | |
| DE | 69312516 | 2/1998 | |
| DE | 102005060638 | 6/2007 | |
| DE | 102006017379 | 10/2007 | |
| DE | 102015114584 A1 | 3/2016 | |
| DE | 102015208118 | 11/2016 | |
| DE | 102015208136 | 11/2016 | |
| DE | 102015115973 | 3/2017 | |
| EP | 0283086 | 9/1988 | |
| EP | 0334366 | 9/1989 | |
| EP | 0577986 | 1/1994 | |
| EP | 577986 A2 * | 1/1994 | .......... B25J 9/1697 |
| EP | 69109038 | 11/1995 | |
| GB | 2174686 | 11/1986 | |
| JP | 2005231789 | 9/2005 | |

OTHER PUBLICATIONS

Bøgh, et al., "Does your Robot have Skills?" Proceedings of the 43rd International Symposium on Robotics, Aug. 29, 2012 (7 pages, including a cover page).

Bøgh, et al., "Idenitfying and evaluating suitable tasks for autonomous industrial mobile manipulators (AIMM)," The International Journal of Advanced Manufacturing Technology, vol. 61, published online Nov. 25, 2011 (pp. 713-726).

GD Robotics, "LBR iiwa 14 R820" <https://www.youtube.com/watch?v=3tYsxuDOAms> published May 5, 2016 (1 page).

Letter from Krones AG dated Oct. 11, 2022, regarding Patent EP3612481B1 (4 pages).

Roth Technik: Performance in Production, "Automatisierung einer CNC Fräse mit einem Universal Robot" <https://www.youtube.com/watch?v=3tYsuxDOAms> published Dec. 17, 2016 (1 page).

* cited by examiner

CONSUMABLE-MATERIAL HANDLING DEVICE FOR TRANSPORTING AND/OR HANDLING AT LEAST ONE CONSUMABLE MATERIAL, IN PARTICULAR PACKAGING MATERIAL

BACKGROUND OF THE INVENTION

Consumable-material handling devices for handling at least one consumable material, in particular a packaging material, are already known which have at least one at least partially autonomous handling unit which is provided at least for handling the consumable material.

SUMMARY OF THE INVENTION

The invention is based on a consumable-material handling device for transporting and/or handling at least one consumable material, in particular a packaging material, having at least one at least partially autonomous handling unit which is provided at least for handling the consumable material.

It is proposed that the consumable-material handling device has at least one, at least partially autonomous, mobility unit on which the handling unit is arranged and which is provided at least for permitting at least partially autonomous locomotion of the handling unit. "Locomotion" is to be understood to mean an active or passive change in location of at least one element and/or one unit in a spatial system. The mobility unit may be provided for imparting active locomotion of the handling unit, in particular by means of a drive unit of the mobility unit. The mobility unit may alternatively or additionally be provided for permitting locomotion of the handling unit owing to an action of an external force, imparted for example by an operator, in particular by means of at least one rolling element, one slide element, one guide rail element, or the like, of the mobility unit. "Provided" is to be understood to mean specially programmed, specially designed and/or specially equipped. The statement that an element and/or a unit is provided for a particular function is to be understood to mean that the element and/or the unit perform(s) and/or carry/carries out this particular function in at least one state of use and/or operation. The mobility unit preferably comprises at least one rolling element formed as a roller or wheel, by means of which locomotion of the handling unit relative to an underlying surface can be effected. The rolling element may be formed as a smart wheel, which has an integrated drive unit and an integrated sensor unit in order to assist an operator in a process of pushing or pulling the mobility unit and/or the handling unit, in a manner already known to a person skilled in the art. It is alternatively or additionally conceivable for the mobility unit to have a magnetic rail guide element, a rail guide element, or the like, by means of which locomotion of the handling unit can be made possible. For example, it is conceivable for the mobility unit to be provided for interacting with a magnetic rail transport system or a guide rail transport system in a production hall in order to permit locomotion of the handling unit. The mobility unit preferably comprises at least one rack or one frame on which the handling unit is arranged and can be at least partially fixed. Preferably, at least one base plate of the handling unit is fixed to the rack or to the frame of the mobility unit. Mobility elements, such as for example rollers, wheels, chains, rail wheels, air cushion elements, or the like, of the mobility unit are preferably arranged on the rack or on the frame of the mobility unit and are movably mounted on the rack or on the frame. The mobility unit preferably comprises at least one brake unit which is provided for preventing movement of mobility elements of the mobility unit or reducing a speed. The brake unit may be formed as an immobilizing brake and/or as a travel brake. The brake unit is preferably of a design already known to a person skilled in the art. The consumable-material handling device, in particular at least the handling unit and/or the mobility unit, may preferably be designed so as to act as a robot which collaborates with an operator in at least one operating mode.

The mobility unit comprises, in at least one embodiment of the consumable-material handling device, at least one drive unit, in particular at least one electric motor unit, for actively driving at least one mobility element of the mobility unit. It is conceivable for the mobility unit to comprise a multiplicity of drive units, wherein in each case one of the drive units is assigned to a single mobility element. It is however also conceivable for the mobility unit to have a single drive unit, in particular a single electric motor unit, which is provided for driving a multiplicity of mobility elements of the mobility unit in particular via an output unit, for example a transmission unit or the like.

The handling unit comprises at least one robot arm, for example a multi-axis robot arm. The robot arm is arranged by means of the base plate of the handling unit on the mobility unit, for example on the rack or on the frame of the mobility unit. The robot arm preferably has more than one movement axis. In some embodiments, the robot arm has more than two, more than four, or more than six movement axes. The handling unit preferably comprises at least one handling element arranged on the robot arm. The handling element may for example be formed as a gripper arranged on the robot arm, a holding fork arranged on the robot arm, a holding mandrel arranged on the robot arm, or the like. The handling element is preferably mounted so as to be movable, in particular by means of the robot arm. The handling unit is preferably provided for handling consumable material, for example a packaging material, where the handling can include at least partially autonomously feeding said material to a production and/or packaging machine. The consumable material is preferably formed as packaging material, for example packaging film, which is formed as roll goods. The handling unit is preferably provided for handling packaging film rolls and for at least partially autonomously feeding said rolls to, or removing said rolls from, a production and/or packaging machine. It is however also conceivable for the handling unit to be provided for handling some other consumable material that appears expedient to a person skilled in the art, for example for handling a consumable material such as glue, adhesive, a flat cardboard blank, a film roll, a paper blank, a cardboard roll, a paper leaflet, or the like.

The consumable-material handling device may have at least one cleaning unit, in particular a suction and/or sweeping unit, which is provided for removing, suctioning and/or sweeping away residues of the at least one consumable material. The cleaning unit may be arranged on the handling unit and/or on the mobility unit. In the case of an arrangement of the cleaning unit on the mobility unit, the cleaning unit is preferably arranged on a side of the mobility unit facing toward an underlying surface in order to permit cleaning of an underlying surface, for example, a floor of a production hall. In the case of an arrangement of the cleaning unit on the handling unit, the cleaning unit is preferably arranged on the at least one handling element. It is however also conceivable for the cleaning unit of the consumable-material handling device to be arranged at some other position that appears expedient to a person skilled in the art.

The handling unit preferably comprises at least one processing unit for open-loop and/or closed-loop control of the robot arm and/or of the handling element. A "processing unit" is to be understood in particular to mean a unit with an information input, an information processing means and an information output. The processing unit advantageously has at least one processor, a memory, input and output means, further electrical components, an operating program, closed-loop control routines, open-loop control routines, and/or calculation routines. The components of the processing unit are preferably arranged on a common circuit board and/or advantageously arranged in a common housing. The processing unit may alternatively or additionally be provided for open-loop and/or closed-loop control of the at least one drive unit of the mobility unit. Preferably, the processing unit may alternatively or additionally be provided for open-loop and/or closed-loop control of autonomous travelling operation of the mobility unit. To realize autonomous travelling operation of the mobility unit, the consumable-material handling device preferably comprises at least one sensor unit which is provided for detecting surroundings parameters, which can be processed by the processing unit for open-loop and/or closed-loop control of autonomous travelling operation of the mobility unit. The sensor unit may include a camera, an ultrasound sensor element, a radar element, a laser scanner element, a magnetic loop element, or the like, and combinations thereof. The sensor unit is provided for detecting at least one surroundings parameter in a manner already known to a person skilled in the art. The processing unit is provided for processing the at least one detected surroundings parameter in a manner already known to a person skilled in the art in order to realize at least open-loop and/or closed-loop control of autonomous travelling operation of the mobility unit. The processing unit can be alternatively or additionally provided for controlling the handling unit in open-loop and/or closed-loop fashion in a manner dependent on the detected surroundings parameter. It is conceivable for detection of a consumable material to be able to be performed for example by means of a camera of the sensor unit, in order to monitor that, prior to the introduction of a consumable material into a production and/or packaging machine, material residues and/or storage elements, for example empty rolls, have been removed from consumable materials that have already been previously introduced into the production and/or packaging machine. The sensor unit may preferably be designed such that a region surrounding the consumable-material handling device is scanned and divided into safety areas. The processing unit may operate the consumable-material handling device in different operating modes in a manner dependent on a division of a region into safety areas. For example, it is conceivable for the safety areas to define different distance ranges around the consumable-material handling device. It is conceivable for the consumable-material handling device to be operable with a high working speed in a manner dependent on a detection of operator-free safety areas, i.e., so that no person is situated in one of the predefined distance ranges, wherein a working speed can be varied in a manner dependent on a distance to the operator. For example, a reduction of the working speed can be implemented in response to a reduction of a distance of an operator relative to the consumable-material handling device. By means of a detection of a surroundings parameter, a field of action of the handling unit and/or of the mobility unit can preferably be monitored. It is advantageously possible for an approach of an operator to the handling unit and/or to the mobility unit to be detected. Preferably, an approach of an operator to the handling unit and/or to the mobility unit can be processed by means of the processing unit such that, if a risk is posed to the operator by the handling unit and/or by the mobility unit due to a safety distance being undershot, it is possible for an emergency stop function to be initiated, for a movement of the consumable-material handling device around the operator to be initiated, or the like.

Operator-friendly handling of consumable material, in particular of packaging material, can advantageously be made possible by means of an embodiment of the invention. Operator-assisting handling and/or operator-assisting transport of consumable material, in particular of packaging material, can advantageously be made possible. A burden on an operator can advantageously be reduced. A high degree of automation can advantageously be made possible.

It is furthermore proposed that the consumable-material handling device comprises at least one provision and/or storage unit, which has at least one holding element on which at least the consumable material for handling by means of the handling unit can be arranged, provided, and/or stored. The provision and/or storage unit may be formed as a separate unit, which is detachably connectable to the mobility unit by means of a coupling unit, for example a trailer coupling unit. The provision and/or storage unit may comprise a further mobility unit, which is provided for permitting locomotion of the provision and/or storage unit, which can provide at least partially autonomous locomotion of the provision and/or storage unit. It is conceivable that, after a detection of an empty state of the consumable material, autonomous locomotion of the provision and/or storage unit to a store can be effected by means of the further mobility unit in order to pick up required consumable material. The provision and/or storage unit may be arranged on the rack or on the frame of the mobility unit such that locomotion of the provision and/or storage unit together with the handling unit can be performed by means of the mobility unit. The at least one holding element of the provision and/or storage unit may be formed as a holding recess, as a holding fork, as a holding mandrel, as a holding groove, as a holding shell, as a holding depression, or the like, and may be provided for holding consumable material. The at least one holding element is particularly preferably provided for holding, providing, and/or storing packaging material formed as packaging film rolls. Alternatively or in addition, the at least one holding element is provided for holding consumable material formed as empty rolls. It is also conceivable for the provision and/or storage unit to have at least one further holding element for holding at least one consumable material formed as an empty roll. The at least one holding element and the at least one further holding element may be of at least substantially analogous design or may be designed differently than one another. It is also conceivable for the provision and/or storage unit to have at least one additional holding element designed such that a consumable material formed as a packaging film roll, at least with a partial region on which at least one connecting means, for example an adhesive strip or an adhesive tape, is arranged and can be held such that a substantially dust-protected arrangement of the partial region can be realized, for example by a holding depression or the like, which is equipped with at least one sealing lip. By means of the embodiment according to the invention, a convenient provision of consumable material, which can be arranged, provided, and/or stored in a vicinity of the handling unit, can advantageously be made possible. User-friendly handling of consumable material, in particular packaging material, can advantageously be made possible. A high degree of automation can advantageously be realized.

It is furthermore proposed that the consumable-material handling device also comprises at least one measuring unit, which is arranged on the provision and/or storage unit and which is provided for determining a mass of the at least one consumable material. The measuring unit preferably comprises at least one measuring element which is provided for determining a mass of the at least one consumable material. The at least one measuring element is preferably arranged on the provision and/or storage unit. In particular, the at least one measuring element is arranged on the provision and/or storage unit which is arranged on the mobility unit, for example on the rack or on the frame of the mobility unit. The at least one measuring element is preferably formed as a weighing scale. It is also conceivable for the measuring unit to indirectly determine or calculate the mass, for example on the basis of a measurement of a consumable-material parameter which differs from a mass of the consumable material, for example a dimension, in particular a diameter or the like. It is also conceivable for the measuring unit to determine a mass in a manner dependent on a comparison of measured consumable-material parameters, which differ from a mass of the consumable material, for example a dimension, in particular a diameter or the like, with reference values stored in a database. It is also conceivable for the mass to be determinable in a manner dependent on a power parameter, for example a current, of at least one drive unit of the handling unit, for example an electric motor unit of the robot arm. It is preferable for at least one parameter of the handling unit and/or of the mobility unit to be controllable in open-loop and/or closed-loop fashion by means of the processing unit in a manner dependent on the detected mass. For example, it is conceivable for a speed, in particular a travelling speed, of the handling unit and/or of the mobility unit to be controlled in open-loop and/or closed-loop fashion by means of the processing unit in a manner dependent on a mass of a consumable material for handling and/or for transporting. The consumable-material handling device preferably comprises at least one position and/or situation determination unit which is provided for determining and/or detecting a position and/or a situation of a consumable material, of the handling unit, and/or of the mobility unit. The position and/or situation of a consumable material detected and/or determined by means of the position and/or situation determination unit can preferably be processed by means of the processing unit for open-loop and/or closed-loop control of the handling unit and/or of the mobility unit. By means of the embodiment according to the invention, a mass of a consumable material for handling can advantageously be determined at an early point in time, to be able to assist an operator in a work operation or to be able to at least output a notification that it is considered expedient to perform an assisting handling operation. A convenient provision of consumable material, which can be arranged, provided, and/or stored in a vicinity of the handling unit, can advantageously be made possible. User-friendly handling of consumable material, in particular of packaging material, can advantageously be made possible. A high degree of automation can advantageously be realized.

It is furthermore proposed that the consumable-material handling device has at least one detection unit for detecting at least one material-specific parameter of the at least one consumable material. The detection unit preferably has at least one detection element, which is arranged preferably on the handling unit, for example on the robot arm or on the handling element. The at least one detection element may be provided for detecting, for example, a start of a consumable material formed as a packaging film roll, a position of an adhesive tape on a consumable material formed as a packaging film roll, a position of a connecting point of a consumable material formed as a packaging film roll, a machine-readable code applied to the consumable material, a density of the consumable material, a type of the consumable material, a location of damage to the consumable material, or the like. The detection unit may have a multiplicity of detection elements which are provided for detecting different material-specific parameters of the at least one consumable material. By means of the embodiment according to the invention, a parameter of the consumable material which is relevant for handling and/or transport of the consumable material can advantageously be detected in a convenient manner. A high degree of automation can advantageously be realized.

It is furthermore proposed that the consumable-material handling device comprises at least one connecting-means application unit which is provided for applying at least one connecting means to the at least one consumable material in order to permit a connection of the at least one consumable material to a further consumable material. Preferably, the connecting-means application unit is provided for applying a connecting means formed as adhesive, in particular an adhesive tape, to the at least one consumable material after an at least partially autonomous feed of the consumable material to the production and/or packaging machine, to connect the fed consumable material to a further consumable material that is already arranged in the production and/or packaging machine. The consumable material and the further consumable material are preferably formed as roll goods, in particular as packaging film roll goods. The production and/or packaging machine preferably comprises at least one tubular-bag packaging unit which can be supplied with consumable material by means of the consumable-material handling device. The connecting-means application unit is preferably provided for applying a connecting means formed as adhesive, in particular adhesive tape, to a free end of a consumable material such as packaging film roll goods that is to be newly introduced into the production and/or packaging machine. The handling unit is preferably provided for introducing the consumable material, in particular the packaging film roll goods, into the production and/or packaging machine and connecting the free end, by the connecting means arranged there, to a further consumable material that is already arranged in the production and/or packaging machine. A high degree of automation can advantageously be realized by means of the embodiment according to the invention. A substantially flowing change of consumable materials can advantageously be made possible.

It is furthermore proposed that the consumable-material handling device comprises at least one communication unit for exchanging electronic data with an external unit, wherein at least one operation of handling and/or transporting the at least one consumable material is performed in a manner dependent on an exchange of electronic data. The communication unit is preferably formed as a wireless communication unit. The communication unit may be formed as a WLAN communication unit, as a Bluetooth communication unit, as a radio communication unit, as an RFID communication unit, as an NFC unit, as an infrared communication unit, as a mobile radio network communication unit, or the like. The communication unit is preferably provided for a bidirectional transmission of data. In an alternative embodiment, the communication unit is formed as a wired communication unit, for example as a LAN communication unit, as a USB communication unit, or the like. The external unit is preferably formed as: at least one further consumable-material handling device, the production and/or packaging machine, a consumable-material store, a central processing unit for open-loop and/or closed-loop control of operation at a production site, a smartphone, a laptop, a tablet, a smartwatch, or the like. It is conceivable for an initiation of a change of consumable material or of a loading of consumable material to be performed in a manner dependent on a transmission of electronic data by means of the communication unit between the consumable-material handling device and the production and/or packaging machine. A transmission of data between the consumable-material handling device and the production and/or packaging machine may be performed directly or indirectly, for example via a server, a router, or the like. It is for example also conceivable for an initiation of a loading or unloading of the provision and/or storage unit to be performed in a manner dependent on a transmission of electronic data by means of the communication unit on an external unit, for example by a central processing unit, or vice versa. Further initiations that appear expedient to a person skilled in the art for open-loop and/or closed-loop control of at least partially autonomous operation of the consumable-material handling device are likewise conceivable. The electronic data that can be exchanged between the communication unit and the external unit may for example relate to a location of the consumable-material handling device, a storage location of consumable material, a format parameter of a consumable material for handling and/or for transporting, running and/or movement times of the consumable-material handling device, a number of changes of consumable material, a number of consumable materials that have been identified as being incorrectly prepared, a number of battery charging cycles and/or battery charging times, open-loop and/or closed-loop control data, or the like. By means of the embodiment according to the invention, it is advantageously possible for communication of the consumable-material handling device with an external unit to be realized which can advantageously be utilized for open-loop and/or closed-loop control of the consumable-material handling device in accordance with demand. Reliable monitoring of functions of the consumable-material handling device can advantageously be achieved. A high degree of automation can advantageously be realized.

It is furthermore proposed that the consumable-material handling device comprises at least one outer-packaging opening unit, for example a cutting and/or torch unit, which is provided for opening at least one outer packaging, for example a protective film, which at least partially surrounds the at least one consumable material. The outer-packaging opening unit is preferably arranged on the robot arm. The outer-packaging opening unit is preferably mounted in movable fashion by means of the robot arm. It is alternatively or additionally conceivable for the outer-packaging opening unit to be mounted movably on the robot arm, for example in an embodiment of the outer-packaging opening unit as a foldable cutting unit, which has for example a foldable blade or the like. The outer-packaging opening unit is preferably provided for opening an outer packaging, for example a protective film, which surrounds a multiplicity of consumable materials collectively. The multiplicity of consumable materials are arranged collectively on one delivery unit, for example one palette, and surrounded collectively by an outer packaging in the form of a protective film, wherein the outer-packaging opening unit is provided for opening, for example by cutting and/or melting the outer packaging. By means of the embodiment according to the invention, it is advantageously possible for convenient opening of an outer packaging to be realized and for a subsequent automatic withdrawal and/or removal of consumable material to be made possible. A high degree of automation can advantageously be realized.

It is furthermore proposed that the consumable-material handling device comprises at least one access opening unit which is provided for detecting a position of an access opening to a production and/or packaging machine and actuating at least one access closure element which closes the access opening of the production and/or packaging machine. A detection of an access opening to a production and/or packaging machine may be realized by means of a transmission of electronic data via the communication unit on the basis of a transmission of location and/or orientation data of the production and/or packaging machine and a comparison with location data of the consumable-material handling device. It is however also conceivable for a detection of an access opening to a production and/or packaging machine to be performed by means of the sensor unit of the consumable-material handling device, for example by means of a camera. The access opening unit may be formed at least partially integrally with the handling unit, and thus an opening element of the access opening unit may be formed integrally with the handling element. The access opening unit is in particular arranged at least partially on the handling unit. The access opening unit is preferably provided for opening or closing an access closure element, for example an access door, which closes the access opening of the production and/or packaging machine in order to permit a change of consumable material that can be arranged in the production and/or packaging machine. It is however also conceivable for the access closure element and/or a locking element which locks the access closure element to be actuatable by means of a drive unit of the production and/or packaging machine in a manner dependent on a transmission of electronic data between the consumable-material handling device and the production and/or packaging machine. By means of the embodiment according to the invention, an at least partial automated process for changing consumable material can advantageously be achieved. A high degree of automation can advantageously be realized.

Also proposed is a production and/or packaging system having at least one production and/or packaging machine and having at least one consumable-material handling device according to the invention for stocking and/or loading the production and/or packaging machine with at least one consumable material. The production and/or packaging machine preferably comprises at least one tubular-bag packaging unit which can be supplied with consumable material by means of the consumable-material handling device. It is however also conceivable for the production and/or packaging machine to have further units which appear expedient to a person skilled in the art and which can be supplied with consumable material by means of the consumable-material handling device. By means of the embodiment according to the invention, an at least partial autonomous process for changing consumable material can advantageously be achieved. A high degree of automation can advantageously be realized.

It is furthermore proposed that the production and/or packaging system comprises at least one charging station which is provided for supplying energy to an energy store unit of the consumable-material handling device. The charging station is preferably formed as a static charging station. It is however also conceivable for the charging station to be of mobile form and to be capable of at least partially autonomous locomotion. The charging station may be formed as a contactless charging station, for example as an induction charging station, or as a contact-type charging station, which has in particular at least one charging contact unit. The consumable-material handling device is provided for autonomously travelling to the charging station and initiating a charging process in the event of detection of a low energy capacity of an energy store unit, for example of a battery pack unit, of the consumable-material handling device. It is however also conceivable for the charging station to be of mobile form and to be capable of at least partially autonomous locomotion, wherein autonomous locomotion of the mobile charging station to the consumable-material handling device may be performed in a manner dependent on a transmission of electronic data between the communication unit of the consumable-material handling device and a communication unit of the charging station. An at least partial autonomous charging process of an energy store unit of the consumable-material handling device can advantageously be achieved by means of the embodiment according to the invention. A high degree of automation can advantageously be realized.

Also disclosed herein is a method for changing and/or replenishing at least one consumable material on a production and/or packaging machine by means of a consumable-material handling device. In one exemplary method step, by means of a consumable-material handling device, autonomous transport of the at least one consumable material to the production and/or packaging machine and/or an autonomous process of changing the at least one consumable material are/is performed. In another exemplary method step, only an autonomous process of changing the at least one consumable material is performed, wherein the consumable material can be supplied by an operator by means of a separate provision and/or storage unit which is of mobile form and which is designed to be movable manually by an operator. It is however also conceivable for the provision and/or storage unit to be of mobile form and to be designed to be capable of autonomous locomotion, wherein, in at least one method step, autonomous transport of consumable material to the handling unit, which is arranged in a vicinity of the production and/or packaging machine, is performed by means of the provision and/or storage unit. In another exemplary method step, an autonomous process of changing the at least one consumable material is performed by means of the handling unit. Further method steps that appear expedient to a person skilled in the art for changing and/or replenishing at least one consumable material by means of the consumable-material handling device are likewise conceivable. By means of the embodiment according to the invention, user-friendly handling of consumable material, in particular of packaging material, can advantageously be made possible. Operator-assisting handling and/or operator-assisting transport of consumable material, for example packaging material, can advantageously be made possible. A burden on an operator can advantageously be reduced. A high degree of automation can advantageously be made possible.

It is furthermore proposed that, in at least one method step, an access closure element of the production and/or packaging machine is autonomously opened and/or closed by means of the consumable-material handling device. By means of the embodiment according to the invention, an at least partial autonomous process of changing consumable material can advantageously be achieved. A high degree of automation can advantageously be realized.

Here, the consumable-material handling device according to the invention, the production and/or packaging system according to the invention, and/or the method according to the invention are/is not intended to be restricted to the use and embodiment described above. In particular, the consumable-material handling device according to the invention, the production and/or packaging system according to the invention, and/or the method according to the invention may, in order to perform a function described herein, have a number of individual elements, components and units and method steps which deviates from a number stated herein. Furthermore, where value ranges are stated in this disclosure, values lying within the stated boundaries are also intended to be disclosed and usable as desired. Furthermore, all features disclosed in relation to the device according to the invention are also intended to be disclosed in relation to the method according to the invention, and vice versa.

BRIEF DESCRIPTION OF THE DRAWINGS

Further advantages will emerge from the following description of the drawing. The drawings illustrate exemplary embodiments of the invention. The drawings, the description and the claims contain numerous features in combination. A person skilled in the art will expediently also consider the features individually and combine them to form meaningful further combinations.

In the drawings.

DETAILED DESCRIPTION

Figure 1:
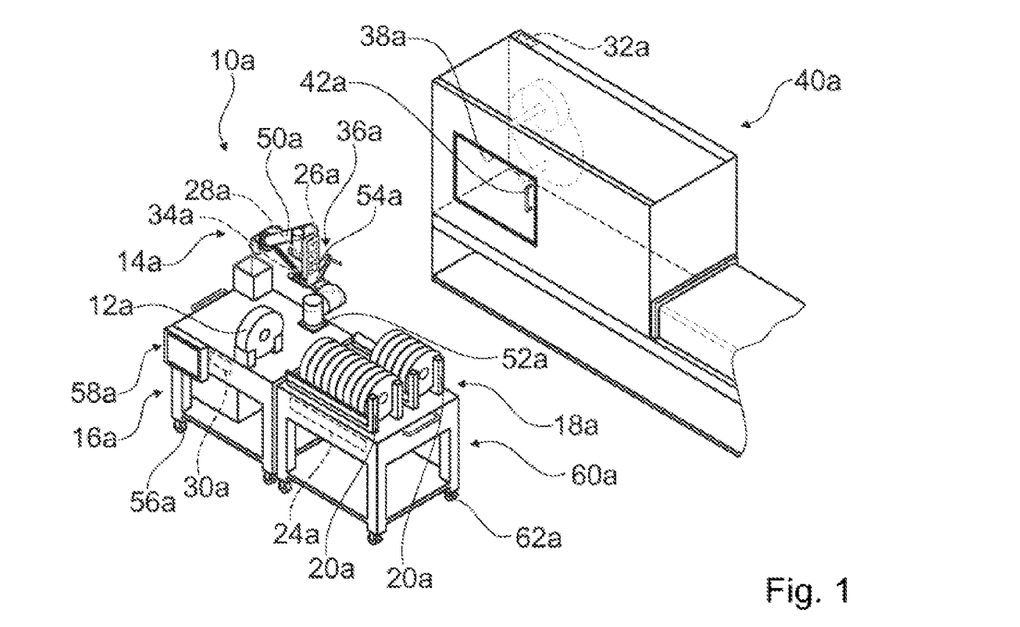
FIG. 1 shows a production and/or packaging system according to the invention having at least one production and/or packaging machine and having at least one consumable-material handling device according to the invention, in a schematic illustration.

FIG. 1 shows a production and/or packaging system 44a having at least one production and/or packaging machine 40a and having at least one consumable-material handling device 10a for stocking and/or loading the production and/or packaging machine 40a with at least one consumable material 12a. The consumable material 12a is preferably formed as roll goods, for example as packaging film roll goods. Products (not illustrated in any more detail here), such as for example foods, for example chocolate bars, or the like, can be packaged by means of the consumable material 12a during a production and/or packaging process of the production and/or packaging machine 40a. The production and/or packaging machine 40a may preferably have a tubular-bag packaging unit which is provided for packaging products by means of the consumable material 12*a*. It is however also conceivable for the production and/or packaging machine 40*a* to have some other packaging unit which appears expedient to a person skilled in the art and which is provided for packaging products by means of the consumable material 12*a* during a production and/or packaging process of the production and/or packaging machine 40*a*. The consumable material 12*a* is preferably formed as roll goods which can be arranged on the production and/or packaging machine 40*a* for the purposes of packaging products. The consumable material 12*a* can, in a manner already known to a person skilled in the art, be processed by means of the production and/or packaging machine 40*a*, for example by the tubular-bag packaging unit, to form a packaging of products.

For transport and/or handling of the at least one consumable material 12*a*, the production and/or packaging system 44*a* preferably comprises the at least one consumable-material handling device 10*a*. It is also conceivable for the production and/or packaging system 44*a* to have more than one consumable-material handling device 10*a* for the purposes of transporting and/or handling the at least one consumable material 12*a*. The consumable-material handling device 10*a* is preferably provided for changing and/or replenishing consumable material 12*a* on the production and/or packaging machine 40*a*. The consumable-material handling device 10*a* for transporting and/or handling the at least one consumable material 12*a*, for example a packaging material, comprises at least one at least partially autonomous handling unit 14*a*, which is provided at least for handling the consumable material 12*a*. The consumable-material handling device 10*a* furthermore comprises at least one mobility unit 16*a*, on which the handling unit 14*a* is arranged and which is provided at least for permitting locomotion of the handling unit 14*a*. The handling unit 14*a* preferably comprises at least one robot arm 50*a*, for example a multi-axis robot arm 50*a*. The robot arm 50*a* is preferably arranged by means of a base plate 52*a* of the handling unit 14*a* on the mobility unit 16*a*, for example on a rack or on a frame of the mobility unit 16*a*. The robot arm 50*a* preferably has more than one movement axis. The robot arm 50*a* preferably has more than two, more than four, or more than six movement axes. The handling unit 14*a* preferably comprises at least one handling element 54*a* arranged on the robot arm 50*a*. The handling element 54*a* may be formed as a gripper arranged on the robot arm 50*a*, a holding fork arranged on the robot arm 50*a*, a holding mandrel arranged on the robot arm 50*a*, or the like (see for example FIG. 6). The handling element 54*a* is preferably mounted so as to be movable, for example by means of the robot arm 50*a*. The handling unit 14*a* is preferably provided for handling consumable material 12*a*, for example packaging material, and for at least partially autonomously feeding said material to the production and/or packaging machine 40*a*. The handling unit 14*a* is preferably provided for handling packaging film rolls, for example for at least partially autonomously feeding said rolls to, or removing said rolls from, the production and/or packaging machine 40*a*. The handling unit 14*a* is preferably provided for at least partially autonomously feeding full packaging film rolls to the production and/or packaging machine 40*a* and/or removing empty packaging film rolls from the production and/or packaging machine 40*a*. It is however also conceivable for the handling unit 14*a* to be provided for handling some other consumable material 12*a* that appears expedient to a person skilled in the art, for example for handling a consumable material 12*a* such as glue, adhesive, a cardboard blank, a film roll, a paper blank, a cardboard roll, a paper leaflet, or the like.

The mobility unit 16*a* preferably comprises at least one rolling element 56*a* formed as a roller or wheel, by means of which locomotion of the handling unit 14*a* relative to an underlying surface can be effected. The rolling element 56*a* may be formed as a smart wheel, which has an integrated drive unit and an integrated sensor unit in order to assist an operator in a process of pushing or pulling the mobility unit 16*a* and/or the handling unit 14*a*. The mobility unit 16*a* preferably comprises at least the rack or the frame on which the handling unit 14*a* is arranged and/or is at least partially fixed. The mobility unit 16*a* preferably comprises at least four rolling elements 56*a*, which are arranged on the rack or on the frame of the mobility unit 16. It is also conceivable for the mobility unit 16*a* to have a number of rolling elements 56*a* other than four. Locomotion of the mobility unit 16*a* can be effected by means of a force exerted by an operator, for example in a manner decoupled from assistance by a drive unit such as an electric motor unit or the like. A supply of energy to the handling unit 14*a* and/or to further units of the consumable-material handling device 10*a* can be realized by means of a wired energy connection and/or by means of an energy storage unit, for example a battery pack unit, arranged on the handling unit 14*a* and/or on the mobility unit 16*a*. The handling unit 14*a* preferably comprises at least one operator control unit 58*a*. The operator control unit 58*a* is preferably arranged on the mobility unit 16*a*. The operator control unit 58*a* is preferably formed as a touch-sensitive display. It is however also conceivable for the operator control unit 58*a* to be of some other form that appears expedient to a person skilled in the art.

Figure 2:
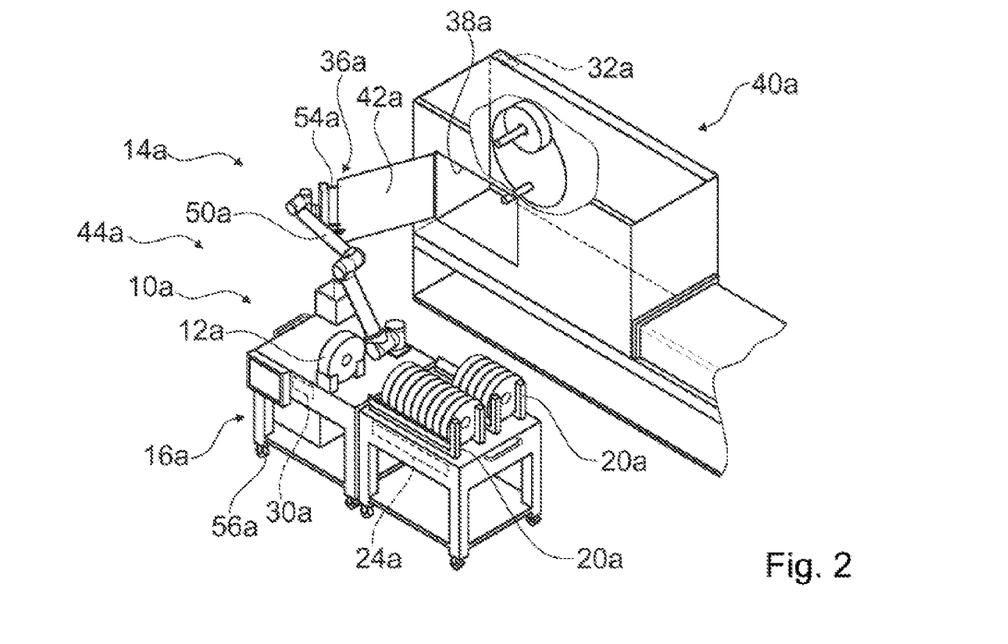
FIG. 2 shows the production and/or packaging system according to the invention during a process of changing consumable material by means of the consumable-material handling device according to the invention, in a schematic illustration.
Figure 3:
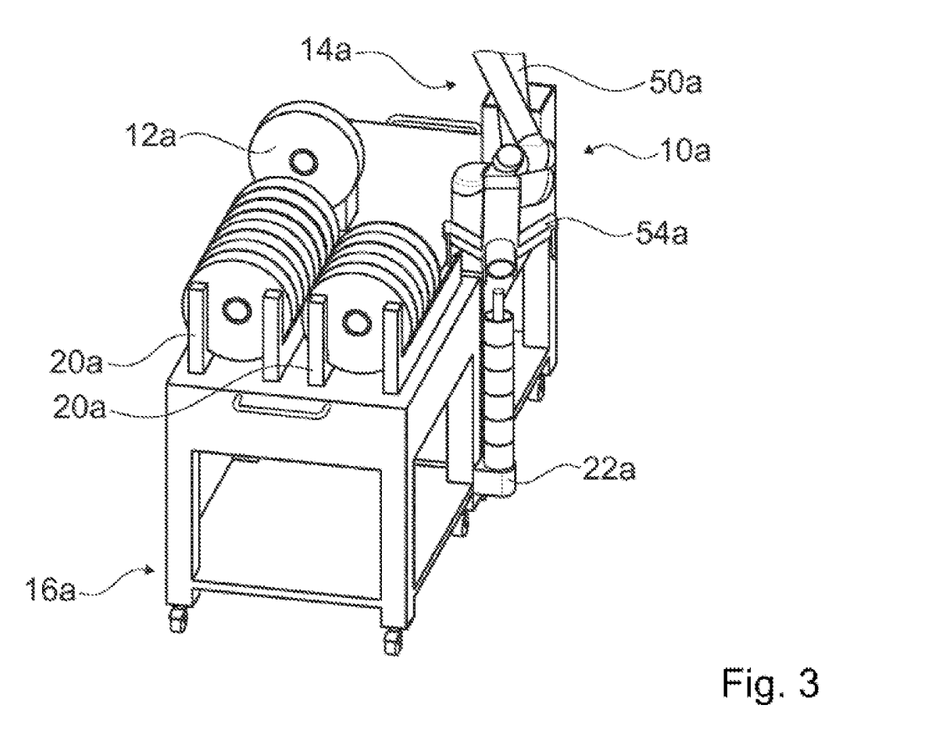
FIG. 3 shows a detail view of a provision and/or storage unit of the consumable-material handling device according to the invention, in a schematic illustration.

The consumable-material handling device 10*a* comprises at least one provision and/or storage unit 18*a*, which has at least one holding element 20*a*, 22*a* on which at least the consumable material 12*a* for handling by means of the handling unit 14*a* can be arranged, provided, and/or stored. In particular, the provision and/or storage unit 18*a* has a multiplicity of holding elements 20*a*, 22*a* on which at least the consumable material 12*a* for handling by means of the handling unit 14*a* can be arranged. At least one of the holding elements 20*a*, 22*a* is provided for provision and/or storage of new consumable material 12*a* that is to be introduced into the production and/or packaging machine 40*a*. At least one of the holding elements 20*a*, 22*a* is provided for providing and/or storing empty rolls that have been removed from the production and/or packaging machine 40*a* (FIGS. 2 and 3). The empty rolls are preferably carrier elements on which consumable material 12*a* is arranged for the purposes of being provided. After the consumable material 12*a* has been consumed by the production and/or packaging machine 40*a*, the empty rolls are left behind. The empty rolls can, by means of the handling unit 14*a*, be removed from the production and/or packaging machine 40*a* and exchanged for new consumable material 12*a*, as is already known to a person skilled in the art.

The provision and/or storage unit 18*a* is preferably arranged on a further mobility unit 60*a* of the consumable-material handling device 10*a*. The further mobility unit 60*a* preferably comprises at least one further rolling element 62*a* which is formed as a roller or wheel and by means of which locomotion of the provision and/or storage unit 18*a* relative to an underlying surface can be effected. The further rolling element 62*a* may be formed as a smart wheel, which has an integrated drive unit and an integrated sensor unit in order to assist an operator in a process of pushing or pulling the further mobility unit 60*a*. The further mobility unit 60*a* preferably comprises at least the rack or the frame on which the provision and/or storage unit 18a is arranged and/or is at least partially fixed. Preferably, the further mobility unit 60a comprises at least four further rolling elements 62a, which are arranged on the rack or on the frame of the further mobility unit 60a. It is however also conceivable for the further mobility unit 60a to have a number of further rolling elements 62a other than four. Locomotion of the further mobility unit 60a can be effected by means of a force exerted by an operator in a manner decoupled from assistance by a drive unit, such as an electric motor unit or the like. It is however also conceivable for the further mobility unit 60a to be formed as a mobility unit with autonomous locomotion capability. The further mobility unit 60a is preferably connectable to the mobility unit 16a, in particular for joint locomotion of the mobility unit 16a and of the further mobility unit 60a.

The consumable-material handling device 10a comprises at least the provision and/or storage unit 18a and at least one measuring unit 24a, which is arranged on the provision and/or storage unit 18a and which is provided for determining a mass of the at least one consumable material 12a. The measuring unit 24a is preferably arranged on at least one of the holding elements 20a, 22a of the provision and/or storage unit 18a. It is however also conceivable for the measuring unit 24a to alternatively or additionally be arranged at least partially on the handling unit 14a. The measuring unit 24a is preferably provided for determining a mass of the at least one consumable material 12a in a state in which the at least one consumable material 12a is arranged in one of the holding elements 20a, 22a. It is however also conceivable for the measuring unit 24a to be provided for determining a mass of the at least one consumable material 12a in a state in which it is arranged on the handling unit 14a.

The consumable-material handling device 10a has at least one detection unit 26a for detecting at least one material-specific parameter of the at least one consumable material 12a. The detection unit 26a is preferably arranged at least partially on the handling unit 14a. It is also conceivable for the detection unit 26a to alternatively or additionally be arranged at least partially on the provision and/or storage unit 18a. The detection unit 26a may be provided for detecting, for example, a start of a consumable material 12a formed as a packaging film roll, a position of an adhesive tape on a consumable material 12a formed as a packaging film roll, a position of a connecting point of a consumable material 12a formed as a packaging film roll, a machine-readable code applied to the consumable material 12a, a density of the consumable material 12a, a type of the consumable material 12a, a location of damage to the consumable material 12a, or the like. The detection unit 26a may have a multiplicity of detection elements (not illustrated in any more detail here) which are provided for detecting different material-specific parameters of the at least one consumable material 12a.

The consumable-material handling device 10a has at least one connecting-means application unit 28a which is provided for applying at least one connecting means to the at least one consumable material 12a in order to permit a connection of the at least one consumable material 12a to a further consumable material that is already arranged in the production and/or packaging machine 40a. The connecting-means application unit 28a is preferably formed as an adhesive-tape application unit, which is provided for applying a connecting means in the form of an adhesive tape to an end of the at least one consumable material 12a, in particular in order to permit an advantageous process of slicing the consumable material 12a and the further consumable material.

The consumable-material handling device 10a comprises at least one communication unit 30a for exchanging electronic data with an external unit 32a. The communication unit 30a can be a wireless communication unit. At least one operation of handling and/or transporting the at least one consumable material 12a is performed in a manner dependent on an exchange of electronic data. The external unit 32a is preferably a part of the production and/or packaging machine 40a. An operation of handling and/or transporting the at least one consumable material 12a by means of the consumable-material handling device 10a can be controlled in open-loop and/or closed-loop fashion in a manner dependent on a transmission of electronic data between the communication unit 30a and the external unit 32a.

The consumable-material handling device 10a comprises at least one outer-packaging opening unit 34a, in particular a cutting and/or torch unit, which is provided for opening at least one outer packaging, in particular a protective film, which at least partially surrounds the at least one consumable material 12a. The outer-packaging opening unit 34a is preferably arranged at least partially on the handling unit 14a. It is however also conceivable for the outer-packaging opening unit 34a to be arranged at least partially on the mobility unit 16a, for example the outer-packaging opening unit 34a can be mounted movably on the mobility unit 16a. It is preferable for at least one cutting element of the outer-packaging opening unit 34a to be arranged and/or mounted movably on the handling unit 14a and/or on the mobility unit 16a.

The consumable-material handling device 10a comprises at least one access opening unit 36a which is provided for detecting a position of an access opening 38a to a production and/or packaging machine 40a and for actuating at least one access closure element 42a, which closes the access opening 38a of the production and/or packaging machine 40a (see FIG. 2). The access opening unit 36a is preferably arranged at least partially on the handling unit 14a.

In a method for changing and/or replenishing at least one consumable material 12a on the production and/or packaging machine 40a by means of the consumable-material handling device 10a, in one exemplary method step, autonomous transport of the at least one consumable material 12a to the production and/or packaging machine 40a, for example from the provision and/or storage unit 18a to the production and/or packaging machine 40a, and/or an autonomous process of changing the at least one consumable material 12a on the production and/or packaging machine 40a, is performed by means of the consumable-material handling device 10a. In another exemplary method step, the access closure element 42a of the production and/or packaging machine 40a is autonomously opened or closed by means of the consumable-material handling device 10a, for example by the handling unit 14a.

With regard to further method steps of the method for changing and/or replenishing at least one consumable material 12a on the production and/or packaging machine 40a by means of the consumable-material handling device 10a, reference may be made to the above description of the production and/or packaging system 44a because said description can also be read analogously onto the method, and thus all features relating to the production and/or packaging system 44a are also to be regarded as being disclosed in relation to the method for changing and/or replenishing at least one consumable material 12a on the production and/or packaging machine 40*a* by means of the consumable-material handling device 10*a*, and vice versa.

Figure 4:
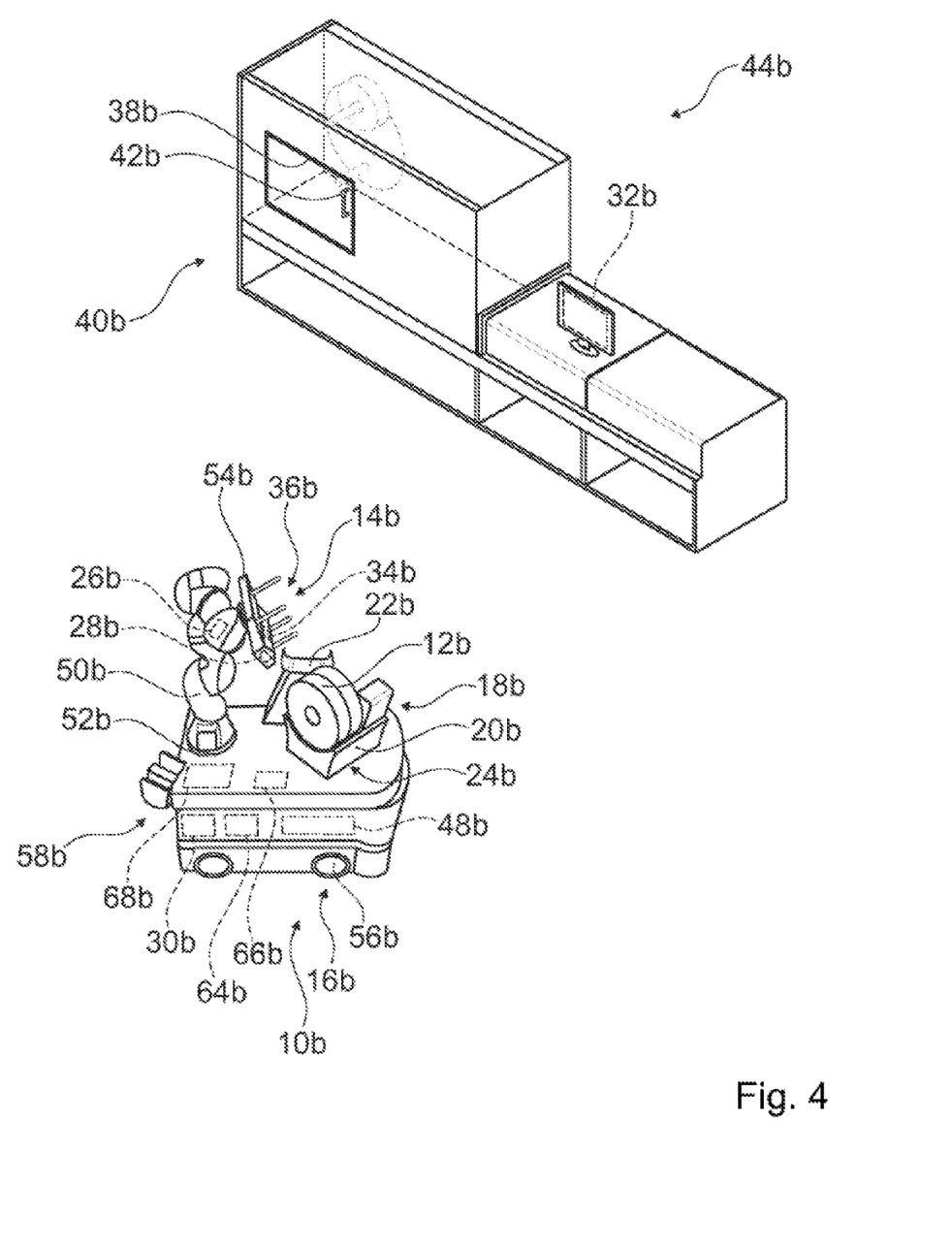
FIG. 4 shows an alternative production and/or packaging system according to the invention having at least one production and/or packaging machine and having at least one consumable-material handling device according to the invention, in a schematic illustration.
Figure 5:
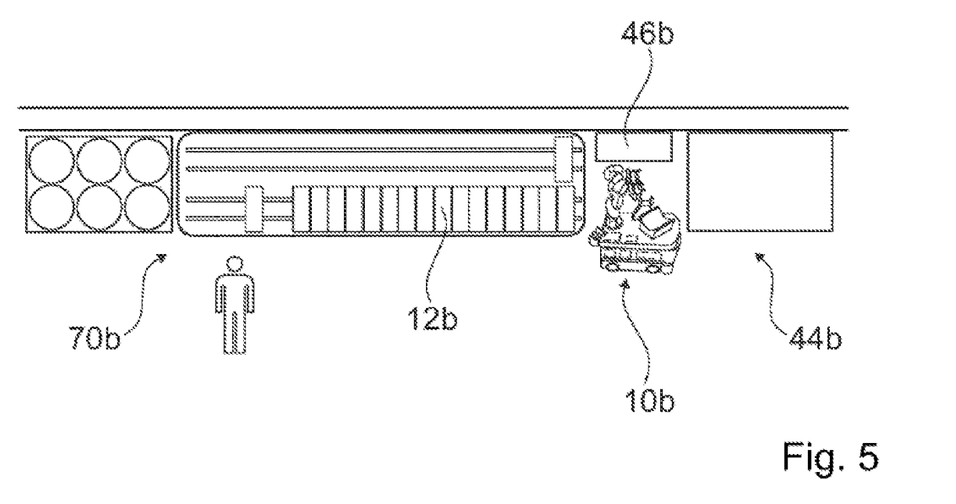
FIG. 5 shows a storage region for consumable material of the alternative production and/or packaging system according to the invention, in a schematic illustration.
Figure 6:
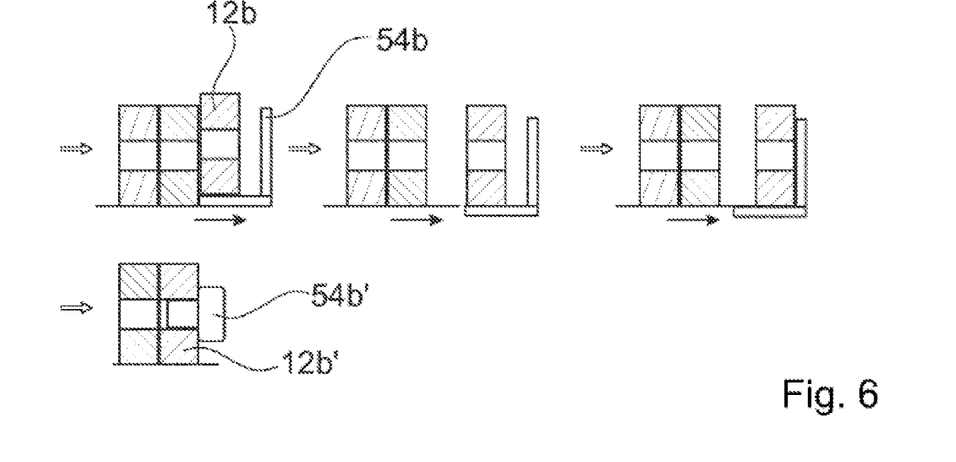
FIG. 6 shows design variants of a handling unit of a consumable-material handling device according to the invention in a schematic illustration.

FIGS. 4 to 6 show a further exemplary embodiment of the invention. The following descriptions are restricted substantially to the differences between the exemplary embodiments, wherein, with regard to components, features and functions that remain unchanged, reference may be made to the description of the other exemplary embodiments, in particular to FIGS. 1 to 3. For distinction between the exemplary embodiments, the alphabetic character a in the reference designations of the exemplary embodiment of FIGS. 1 to 3 has been replaced by the alphabetic character b in the reference designations of the exemplary embodiments of FIGS. 4 to 6. With regard to components of identical designation, in particular with regard to components with the same reference designations, reference may also be made to the drawings and/or to the description of the other exemplary embodiments, in particular to FIGS. 1 to 3.

FIG. 4 shows a production and/or packaging system 44*b* having at least one production and/or packaging machine 40*b* and having at least one consumable-material handling device 10*b* for stocking and/or loading the production and/or packaging machine 40*b* with at least one consumable material 12*b*. The consumable-material handling device 10*b* for transporting and/or handling at least one consumable material 12*b*, for example a packaging material, comprises at least one at least partially autonomous handling unit 14*b*, which is provided at least for handling the consumable material 12*b*. Furthermore, the consumable-material handling device 10*b* comprises at least one mobility unit 16*b*, on which the handling unit 14*b* is arranged and which is provided at least for permitting in particular at least partially autonomous locomotion of the handling unit 14*b*. In some embodiments the mobility unit 16*b* is at least partially autonomous. The mobility unit 16*b* is preferably provided, by contrast to the mobility unit 16*a* from FIGS. 1 to 3, for at least partially autonomous locomotion of the handling unit 14*b*. The mobility unit 16*b* preferably comprises at least one drive unit 64*b*, for example at least one electric motor unit, for driving at least one roller element 56*b* of the mobility unit 16*b*. The consumable-material handling device 10*b* comprises at least one energy store unit 48*b* for a supply of energy to units of the consumable-material handling device 10*b*. The energy store unit 48*b* is, for example, formed as a rechargeable battery unit. The consumable-material handling device 10*b* for example comprises at least one sensor unit 68*b* which is provided for detecting surroundings parameters, which can be processed by a processing unit 66*b* of the consumable-material handling device 10*b* at least for open-loop and/or closed-loop control of autonomous travelling operation of the mobility unit 16*b*.

The production and/or packaging system 44*b* comprises at least one charging station 46*b* which is provided for supplying energy to an energy store unit 48*b* of the consumable-material handling device 10*b* (see FIG. 5). The charging station 46*b* is preferably formed as a static charging station. It is however also conceivable for the charging station 46*b* to be of mobile form and to be capable of at least partially autonomous locomotion. The charging station 46*b* may be formed as a contactless charging station, for example as an induction charging station, or as a contact-type charging station, which has in particular at least one charging contact unit. The consumable-material handling device 10*b* is preferably provided for autonomously travelling to the charging station 46*b* and initiating a charging process in the event of a low energy capacity of the energy store unit 48*b* being detected.

A provision and/or storage unit 18*b* of the consumable-material handling device 10*b* is preferably arranged on the mobility unit 16*b*. It is alternatively or additionally conceivable for the production and/or packaging system 44*b* to have at least one further provision and/or storage unit 70*b* on which at least the consumable material 12*b* for handling by means of the handling unit 14*b* can be arranged, provided, and/or stored (see FIG. 5).

FIG. 6 illustrates design variants of a handling element 54*b* of the handling unit 14*b*. The handling element 54*b* is, in one design variant, formed as a holding fork (see the upper part of FIG. 6) for handling the consumable material 12*b*. In a further design variant, handling element 54*b*' is formed as a handling mandrel, in particular as a movable clamping mandrel (see the lower part of FIG. 6).

With regard to further functions and features of the production and/or packaging system 44*b*, reference may be made to the description of the production and/or packaging system 44*a* in FIGS. 1 to 3.

What is claimed is:

1. A consumable-material handling device for transporting and/or handling at least one consumable material (12*a*; 12*b*), the consumable-material handling device comprising at least one at least partially autonomous handling unit (14*a*; 14*b*), wherein the at least one at least partially autonomous handling unit (14*a*; 14*b*) is configured at least for handling the consumable material (12*a*; 12*b*), and wherein the consumable-material handling device further comprises at least one mobility unit (16*a*; 16*b*) on which the handling unit (14*a*; 14*b*) is arranged, and wherein the at least one mobility unit (16*a*; 16*b*) is configured at least to permit locomotion of the handling unit (14*a*; 14*b*), wherein the consumable-material handling device further comprises at least one access opening unit (36*a*; 36*b*) configured to detect a position of an access opening (38*a*; 38*b*) of a production and/or packaging machine (40*a*; 40*b*) and wherein the at least one access opening unit (36*a*; 36*b*) is configured to actuate at least one access closure element (42*a*; 42*b*) which closes the access opening (38*a*; 38*b*) of the production and/or packaging machine (40*a*; 40*b*), wherein the consumable-material handling device further comprises at least one connecting means application unit (28*a*; 28*b*), which is configured to apply at least one connecting means to the at least one consumable material (12*a*; 12*b*), wherein the connecting means application unit (28*a*; 28*b*) is configured to apply the at least one connecting means formed as adhesive to the at least one consumable material (12*a*; 12*b*).

2. The consumable-material handling device as claimed in claim 1, further comprising at least one provision and/or storage unit (18*a*; 18*b*), wherein the at least one provision and/or storage unit (18*a*; 18*b*) has at least one holding element (20*a*, 22*a*; 20*b*, 22*b*) on which at least the consumable material (12*a*; 12*b*) for handling by the handling unit (14*a*; 14*b*) is arranged.

3. The consumable-material handling device as claimed in claim 1, further comprising at least one provision and/or storage unit (18*a*; 18*b*) and at least one measuring unit (24*a*; 24*b*), wherein the at least one measuring unit (24*a*; 24*b*) is arranged on the provision and/or storage unit (18*a*; 18*b*), and wherein the at least one measuring unit (24*a*; 24*b*) is configured for determining a mass of the at least one consumable material (12*a*; 12*b*).

4. The consumable-material handling device as claimed in claim 1, further comprising at least one detection unit (26*a*; 26*b*) for detecting at least one material-specific parameter of the at least one consumable material (12*a*; 12*b*).

5. The consumable-material handling device as claimed in claim 1, further comprising at least one communication unit (30a; 30b) for exchanging electronic data with an external unit (32a; 32b), wherein at least one operation of handling and/or transporting the at least one consumable material (12a; 12b) is performed in a manner dependent on an exchange of electronic data.

6. The consumable-material handling device as claimed in claim 1, further comprising at least one outer-packaging opening unit (34a; 34b) which is configured to open at least one outer packaging, which at least partially surrounds the at least one consumable material (12a; 12b).

7. The consumable-material handling device as claimed in claim 1, further comprising at least one provision and/or storage unit (18a; 18b), which has at least one holding element (20a, 22a; 20b, 22b) on which at least the consumable material (12a; 12b) for handling by the handling unit (14a; 14b) is provided and/or stored.

8. The consumable-material handling device as claimed in claim 1, wherein the at least one connecting means is configured to permit a connection of the at least one consumable material (12a; 12b) to a further consumable material.

9. The consumable-material handling device as claimed in claim 1, further comprising at least one wireless communication unit (30a; 30b) for exchanging electronic data with an external unit (32a; 32b), wherein at least one operation of handling and/or transporting the at least one consumable material (12a; 12b) is performed in a manner dependent on an exchange of electronic data.

10. The consumable-material handling device as claimed in claim 1, further comprising at least one outer-packaging opening unit (34a; 34b), which includes a cutting and/or torch unit, which is configured to open at least one outer packaging including a protective film, which at least partially surrounds the at least one consumable material (12a; 12b).

11. A consumable-material handling device for transporting and/or handling at least one consumable material (12a; 12b), the consumable-material handling device comprising at least one at least partially autonomous handling unit (14a; 14b), wherein the at least one at least partially autonomous handling unit (14a; 14b) is configured at least for handling the consumable material (12a; 12b), and wherein the consumable-material handling device further comprises at least one mobility unit (16a; 16b) on which the handling unit (14a; 14b) is arranged, and wherein the at least one mobility unit (16a; 16b) is configured at least to permit locomotion of the handling unit (14a; 14b), wherein the consumable-material handling device further comprises at least one outer-packaging opening unit that is configured to open at least one outer packaging that at least partially surrounds the at least one consumable material (12a; 12b).

12. The consumable-material handling as claimed in claim 11, wherein the at least one outer-packaging opening unit (34a; 34b) includes a cutting and/or torch unit that is configured to open at least one outer packaging including a protective film that at least partially surrounds the at least one consumable material (12a; 12b).

* * * * *